(12) United States Patent
Kabelevs et al.

(10) Patent No.: US 6,657,798 B1
(45) Date of Patent: Dec. 2, 2003

(54) METHOD FOR OPTIMIZING THE NUMBER OF GOOD ASSEMBLIES MANUFACTURABLE FROM A NUMBER OF PARTS

(75) Inventors: Nikolajs Kabelevs, Irvington, NY (US); Tomasz Momot, Ossining, NY (US)

(73) Assignee: Electo Optical Sciences, Inc., Irvington, NY (US)

( * ) Notice: Subject to any disclaimer, the term of this patent is extended or adjusted under 35 U.S.C. 154(b) by 0 days.

(21) Appl. No.: 10/361,297

(22) Filed: Feb. 10, 2003

(51) Int. Cl.[7] .................. G02B 7/02; G03B 17/26; G03B 21/14; F21V 17/00
(52) U.S. Cl. ............ 359/819; 396/526; 362/455; 353/100; 359/811
(58) Field of Search .................. 359/819, 811, 359/676, 677, 689, 679; 396/526; 362/455; 353/100; 706/13, 922; 700/28; 702/85; 703/6; 381/60

(56) References Cited

U.S. PATENT DOCUMENTS

| | | | | |
|---|---|---|---|---|
| 4,935,877 A | * | 6/1990 | Koza | 706/13 |
| 5,589,989 A | * | 12/1996 | Estelle et al. | 359/785 |
| 5,805,348 A | * | 9/1998 | Estelle et al. | 359/677 |

* cited by examiner

*Primary Examiner*—Hung Xuan Dang
*Assistant Examiner*—Joseph Martinez
(74) *Attorney, Agent, or Firm*—Rodney T. Hodgson

(57) ABSTRACT

A method for selecting parts for N similar assemblies, each assembly comprising M parts, is presented. A number $p_m$ of physical characteristics for each part of the at least M×N parts is recorded, and a value that a group of parts would have if assembled into an assembly is computed until N groups of parts are selected, each group consisting of one part from each of the M groups of parts, and wherein no part is a member of more than one of the N groups of parts, and wherein the value for each group meets a criterion. The method is particularly useful in constructing lenses.

15 Claims, 3 Drawing Sheets adjustable in 3 dimensions and 2 angles

METHOD FOR OPTIMIZING THE NUMBER OF GOOD ASSEMBLIES MANUFACTURABLE FROM A NUMBER OF PARTS

FIELD OF THE INVENTION

The field of the invention is the field of optical lenses and lens assembly.

BACKGROUND OF THE INVENTION

The field of optical lens design and construction has progressed rapidly with introduction of computer analysis, computer aided production of aspheric lens elements and molds for plastic lens elements, and optical measuring tools for ensuring that the lens elements are within specifications.

The prior art shows that a lens design combining number of lens elements can be produced wherein the lens elements are produced to within specifications on a number of parameters such as diameter, thickness, uniformity of index and uniformity index of refraction, surface curvature, centricity of the surface with respect to the perimeter of the element, and concentricity of the various lens element surfaces with respect to each other. Then, a number of lens elements are typically held together with a lens element holder to produce a finished lens. Typically, the lens element holder has an aperture therethrough for the passage of light through each lens element in turn, and interior dimensions of the lens element holder which are specified to hold the lens elements so that the centers of the various lens elements are held within the correct tolerance with respect to a center line through the lens. The various lens elements are typically held in a spaced apart relationship with each other by spacers.

Lens elements may formed from a single optical material which is transparent to the wavelengths of light for which they are designed, or from a combination of subelements which such as doublets, triplets, and quadruplets. The combinations of subelements typically have two surfaces with concave and convex surfaces matching each other, so that the subelements may be contacted together and affixed together with a thin layer of transparent adhesive. The subelements may be adjusted in physical adjustment to each other. For example, the diameters of the two subelements may be equal to within a certain tolerance, and the alignment is made by ensuring that the diameters of the two subelements line up to within a give tolerance.

A more accurate alignment is possible if the two subelements are adjusted in optical adjustment to each other. In an optical adjustment as defined in this specification, optical means are used to measure the location of the physical parameters of the subelements, such as the optical axis, and the two subelements are moved relative to each other until the optical axis of each element are parallel and as close as possible to each other. Such optical adjustments allow more accuracy in adjusting the optically important parameters of the combination than would be possible with physical adjustment according to their diameters.

All of the elements of the lens, spacers, and holders have to be made to within tight specifications for high quality lenses. The interior of the lens element holder is typically finished by grinding and polishing to achieve tighter tolerances. The edges of the lens elements are ground to achieve a tighter tolerance on the diameter. The spacer elements are ground. All of the operations to bring the tolerance tighter are expensive. Typically, if any of the lens elements, lens element holders, or spacers are out of specification, they are discarded. In this way, the prior art ensures that lenses constructed from a batch of imperfect parts will have a high probability of meeting specifications for the finished lens.

RELATED APPLICATIONS

This application is related to U.S. application Ser. No. 10/361,299 filed the same date as the present application, and entitled "Method for assembling lens elements", by Tomasz Momot and Adam Jacobs.

OBJECTS OF THE INVENTION

It is an object of the invention to provide a method for assembling a number M of spaced apart lens elements and contacted subelements together with a lens element holder into a finished lens, wherein the spacing between adjacent lens elements does not rely on a spacer elements.

It is an object of the invention to provide a method for assembling a number M of spaced apart lens elements together with a lens element holder into a finished lens, wherein alignment of each lens element does not rely on mechanical contact between the body of the lens element holder and each lens element.

It is an object of the invention to provide a group of N lenses, each of the N lenses comprising M lens elements and subelements, starting with M groups of at least N elements and subelements, wherein the lens elements and subelements have relaxed tolerances in their physical characteristics.

It is an object of the invention to provide a method for assembling a large plurality of parts into a plurality N of finished lenses, where each of the N lenses comprises M lens elements, and wherein the tolerances on each of the M lens elements may be greatly broadened.

It is an object of the invention to provide a method for assembling a plurality of parts into a plurality N of finished assemblies, where each of the N finished assemblies comprises M parts cooperating together in the same way to provide the same function, and wherein the tolerances on each of the M parts may be greatly broadened.

SUMMARY OF THE INVENTION

A lens is constructed by optically adjusting lens elements with respect to each other in a spaced apart relationship, then affixing the lens elements so adjusted adhesively to a lens element holder. The physical relationship of each lens element with each other lens element does not rely on physical contact between the lens elements and the lens element holder or spacer elements.

M batches of at least N similar optical elements, where each optical element is produced to a loose tolerance, may be selected into N groups by measuring $p_m$ characteristics of each optical element, and then computing a value that a group of M optical elements, one optical element drawn from each of the M batches would have if assembled together. The computation is continued until N groups of optical elements are selected, each group consisting of one optical element from each of the M groups of optical elements, and wherein no optical element is a member of more than one of the N groups of optical elements, and wherein the value for each group meets a criterion. M batches of at least N similar parts, where each part is produced to a loose tolerance, may be selected into N groups by measuring characteristics of each part, and then computing a value that a group of M parts, one part drawn from each of the M batches would have if assembled together. The computation is continued until N groups of parts are selected, each group consisting of one part from each of the M groups of parts, and wherein no part is a member of more than one of the N groups of parts, and wherein the value for each group meets a criterion.

DETAILED DESCRIPTION OF THE INVENTION

The present invention presents a solution to an unexpected problem. A batch of 10 lenses ordered by the inventors was delivered, and none meet specifications. The lenses were critical to a project, and replacement lenses could not be obtained before a project deadline.

Figure 1:
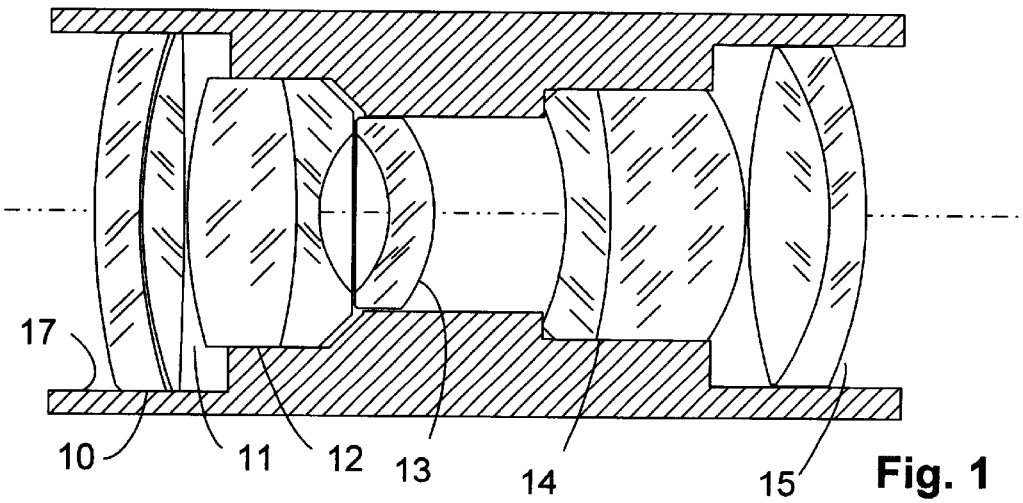
FIG. 1 shows a diagram of a lens assembled in a lens holder.

FIG. 1 shows a sketch of the 6 lens elements (3 singlets 10, 11, and 13 and 3 doublets 12, 14, and 15) held in the appropriate spacial relationship with a lens element holder 17 and spacers (not shown). The lens is a very broad band achromatic designed for excellent performance for all wavelengths between 400 and 1000 nm.

The inventors disassembled the lenses into their component lens elements and subelements, and measured the optical and physical characteristics of the lens elements and the spacings between elements, concentricity, etc, and found that positioning and the physical and optical characteristics of the lens elements and subelements themselves were widely out of specification.

The inventors ran a commercial lens design (Oslo) computer simulation using the measured physical and optical values for the elements for each of the 10 lenses as delivered, and found that none would deliver performance if reassembled to reasonable tolerances in the spacings between the lens elements. In desperation, the inventors tried to mix and match the optical elements and subelements to find some combinations that could be combined into working lenses. The physical characteristics of a set of 9 lens elements and subelements were entered into a computer, and a standard computer program for lens design was run to see if there was any set of the spacing dimensions (now the only adjustable parameter available) between the lens elements which could be varied so that the particular set of lens elements could be assembled into a working lens. In order to automate the procedure, the inventors wrote a computer program which would try various choices of elements (each element having unique thickness, surfaces of curvature, etc.) in the lens design program. The lens design program then calculated the optimal interelement spacing to optimize a value for an optical merit function, which was set to be a function of the MTF of the lens determined at a number of points in the field of view and over the range of design wavelengths. Combinations where the value of the optical merit function did not meet the criterion that the finished lens would have the required resolution over the field of view and wavelength region were discarded, and the process continued with a different set of lens elements and subelements. The procedure was optimized, and resulted in a set of 9 groups of elements which when combined together, would produce 9 working lenses. Indeed, the inventors found upon further computer experimentation that some of the parameters of the lens elements could have been much further out of specification than they were, and they could still find solutions. Such a result is very interesting, since the cost of lens elements rises very greatly as specifications are tightened. An embodiment for finding a group of designs which meet specifications is given later.

A major problem arose, in that the interelement spacing calculated between each lens element was computed to be different for each of the 9 designs for lenses, and that the tolerances on the element spacing and centering were very tight. The inventors solved this problem by an innovative assembly method. They built an optical line up jig which would hold two optical elements, and allow very fine adjustment of each element with respect to other, in three spatial dimensions and two angular dimensions. With the optical elements held in the jigs, the optical alignment of the optical axis of each element could be very accurately measured by optical and physical means and the spacing between the elements adjusted with much more accuracy than would be possible using lens holders and spacer elements having normal tolerances. When the alignment of two elements was adjusted to be that determined by the computer program, the two elements were rigidly affixed to each other by placing wires from the edge of one element to the edge of the next, and affixing the wires with uv curing adhesive. The lens elements were added in sequence until the lens was finished, and the optical performance of the final lens was measured. In each case, the resulting lens met specifications.

Figure 2:
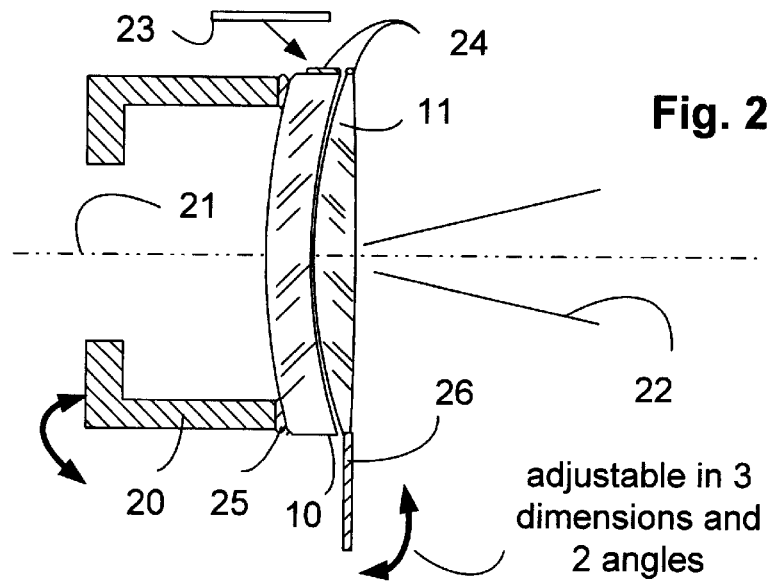
FIG. 2 shows a diagram of a first step in the lens assembly of the invention.
Figure 3:
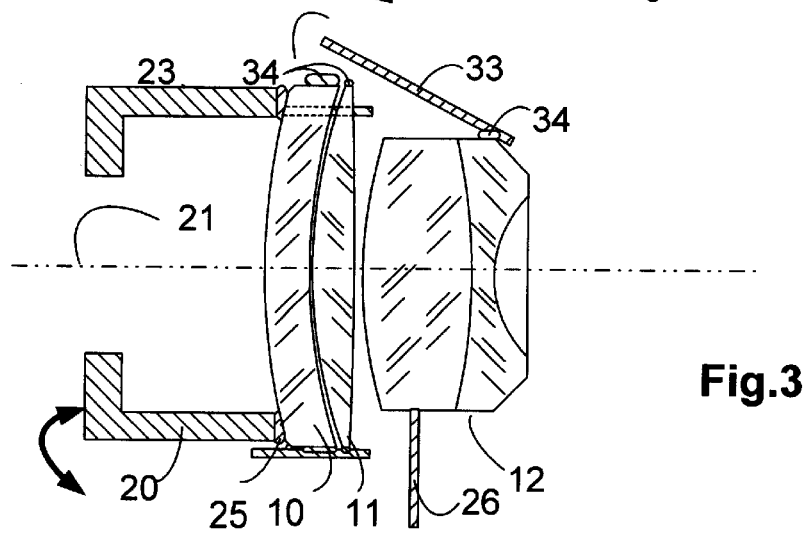
FIG. 3 shows a diagram of a further step in the most preferred lens assembly of the invention.

FIG. 2 shows a sketch of a step of the most preferred embodiment of the invention. Lens element 10 is cemented to a mandrel 20 with a meltable glue 25. The surface of lens 10 that touches the mandrel is aligned by the surface of the mandrel, and by sliding lens 10 on top of the mandrel the second surface of lens 10 is aligned so that the center of the curvature of the surface of lens 10 lies on the optical axis or center line 21. Lens element 11 is then held in a spaced apart relationship with prongs 26 attached to a holder (not shown) so that lens element 11 may be accurately moved in three spatial dimensions and two angular dimensions, and rotated about center line 21. The two angular rotations rotate approximately about the center of lens 11. Light 22 from an optical alignment system (not shown) is shown converging on one of the surfaces of lens elements 10 or 11. Reflected and transmitted light is conveyed through an optical system (not shown) to CCD array or split element detectors (not shown). Lens element 10, for example, is adjusted so that the optical axis of lens element 10 is aligned with the axis of rotation of mandrel 20, which is aligned to be coaxial with the light 22 from the alignment optical system. When the light from the optical system, the optical axis of lens element 10, and the axis of rotation of mandrel 20 are coaxial with line 21, the back reflected light from each surface of lens element 10 is coaxial with line 21 is can be accurately measured with the array detector. Lens element 11 is then adjusted similarly to the same optical axis, and spaced apart distance between lens element 10 and lens element 11 can be accurately adjusted and checked by optical and/or mechanical means until it meets the specification. After the two lens elements have been adjusted with respect to each other, they can be rigidly fixed together by applying wires 23 into a non shrinking adhesive 24 attached to the edges of elements 10 and 11.

A system which works well is to affix at least three wires, preferably 6 wires, and most preferably 9 wires regularly spaced around the circumference of the lens elements 10 and 11. The inventors have found that 0.5 mm piano wire is adequate for the lens elements which have diameters in the 10 mm range. The alignment of the lens elements 10 and 11 is checked once again, and the adhesive cured with ultraviolet light. After the adhesive is cured, the alignment is checked once again, since even the adhesive with the lowest shrinkage commercially available has some shrinkage and can change the alignment. The inventors anticipate that the wires or other lens element holders are be themselves meltable or adhesive, and the adhesive used in the sense of this specification is the material of the lens element holder itself. The inventors anticipate that the lens element holder may be pressed and so deformed that the lens elements are held mechanically in the correct optical alignment by the deformed lens element holder, and that such deformation is also an adhesive in the sense of this specification.

Some wires 23 are preferably placed at angles to prevent relative rotation of elements 10 and 11. The next lens element 12 is then brought in on supported by prongs 26 to repeat the alignment process. After the spaced apart distance of lens elements 11 and 12 is correctly set and the optical axis of lens element 12 is aligned with rotation axis 21, wires 33 are placed in adhesive 34 and the adhesive is cured as before to rigidly connect lens elements 10, 11, and 12. The process is continued until all six lens elements are rigidly connected together in the correct optical relationship. Note that the doublets have previously been adjusted together in the same optical jig, and affixed to each other with optical cement.

Note that no spacers are used to control the spacing between the lens elements, nor are the optical axis of each lens element centered by contacting the edges of each lens element with the barrel of a lens element holder. The plurality of wires in the embodiment described above act as a lens element holder once they are securely bonded to the lens elements with adhesive. After all the lens elements are secured with wires, a protective tube (not shown) is placed over the entire assembly, and the elements 11 and 15 are hermetically sealed to the tube with an elastomeric adhesive which puts little stress on the assembly.

Figure 4:
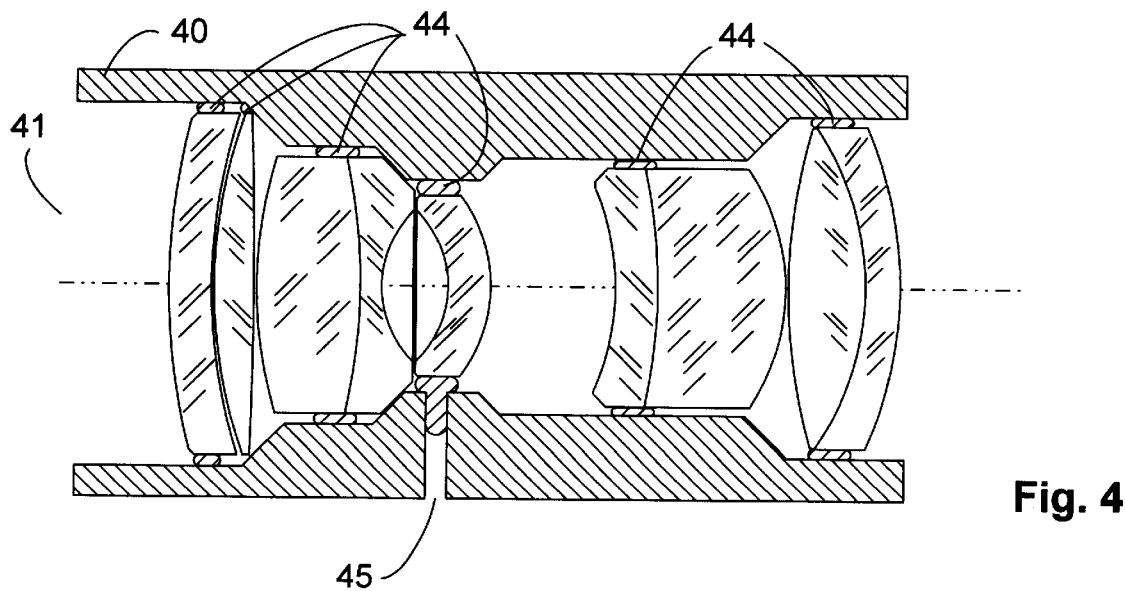
FIG. 4 shows an alternative embodiment of the invention.

Another preferred embodiment of the invention is shown in FIG. 4. A lens element holder 40 is having a clear aperture 41 for passage of light through all the lens elements is used, where there is sufficient clearance between the inside walls of the lens element holder 40 and the outside diameters of lens elements 10–15 to allow optical adjustment of each lens element with respect to the other lens elements. Each lens element can be secured to the lens element holder 40 with adhesive 44. An aperture 45 is shown in lens element holder 40 to allow injection of adhesive 44. Note that the thickness of the adhesive varies to allow the lens elements to be adjusted with respect to the other lens elements rather than with the body of the lens element holder 40.

Figure 5:
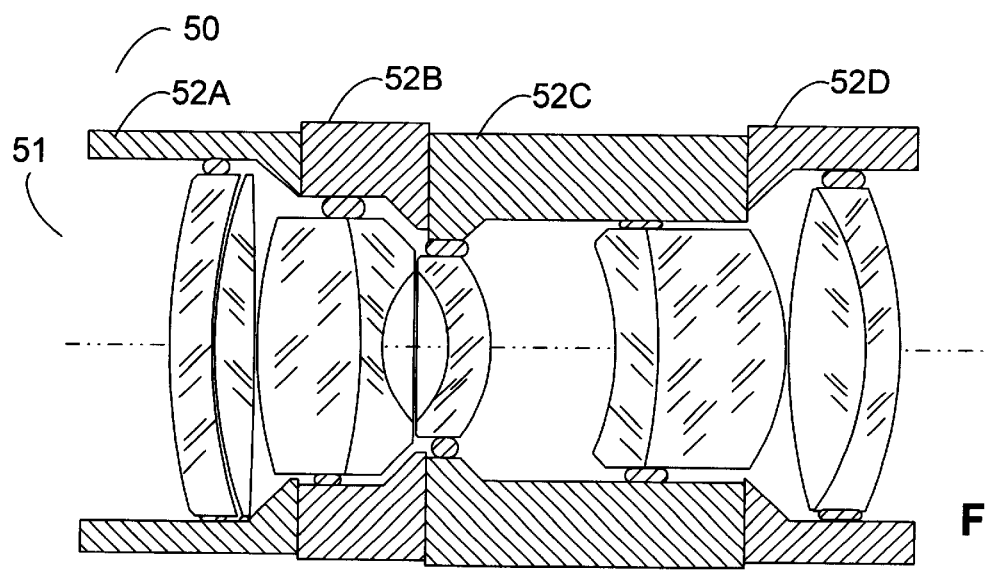
FIG. 5 shows an alternative embodiment of the invention.

A preferred embodiment of the invention is shown in FIG. 5 where a lens element holder 50 is made from a number of bodies 52A, 52B, 52C and 52D, each having a clear aperture 51 for allowing light to pass through the completed lens. The optical elements are optically adjusted to each other and affixed to the respective body with adhesive 54, and the lens element holder bodies 52A, 52B, 52C and 52D are fastened together with fasteners as are known in the art or with adhesive.

In the method of the invention, a number M of parts cooperate together when assembled together to make an assembly. A change in the physical characteristics of one part could be compensated by a change in one or many or all of the other parts. However, only part spacing and orientation may be changed, as the physical characteristics of each part in the M batches of parts are already determined. In the particular case of a lens comprising a number of elements and subelements, for example, each element is made to a specification with lower tolerances than would normally be called for for a lens having a particular design tolerance. In the general case of an assembly of parts, such loosening of tolerances will reduce costs considerably.

A first embodiment for optimization is an exhaustive search, wherein values are calculated for all combinations of the $M \times n_m$ parts, and those combinations where the value meets a criterion are recorded. Then, a set of combinations where no part is used more than once is picked to give the required number of combinations to assemble. For the 10 sets of 9 elements and subelements and the lens design program used, this embodiment would take many years of time to calculate on a pentium computer. The inventors anticipate, however, that for fewer elements, or with faster computers, such an embodiment would provide the optimal solution.

A second embodiment of the invention is to perform a sequential choice, where the search program identifies a first combination, then sets the elements of the first combination aside and searches the reduced set for another combination. This embodiment has a risk that an early combination uses the only part which would make a later combination work.

Artificial Intelligence systems have been proposed in the art for the solution of problems such as classification, prediction of time-series data, symbolic regression, optimal control, etc. Examples of various machine learning systems are neural networks, fuzzy networks, genetic algorithms (including genetic programming and classifier systems), Evolutionary Strategies, Evolutionary Programming, ADATE program induction, cellular automata, Box Jenkins optimization, ARMA optimization and many others. Rather than applying a direct computational approach, these systems create one or more proposed solutions in the form of data and computer program entities, and iteratively alter the data and/or entities for the purpose of finding an optimal solution to a problem. Two standard references are "Genetic Algorithms in Search, Optimization, and Machine Learning", by D. E. Goldberg, Addison-Wesley (1989) and "Handbook of Genetic Algorithms", by L. Davis, Van Nostrand Reinhold, New York, N.Y. (1991). One such approach is described in, for example, U.S. Pat. No. 4,935,877, entitled "Non-linear genetic algorithms for solving problems", issued Jun. 19, 1990 to John Koza. The above reference and patents are included herein by reference.

Figure 6:
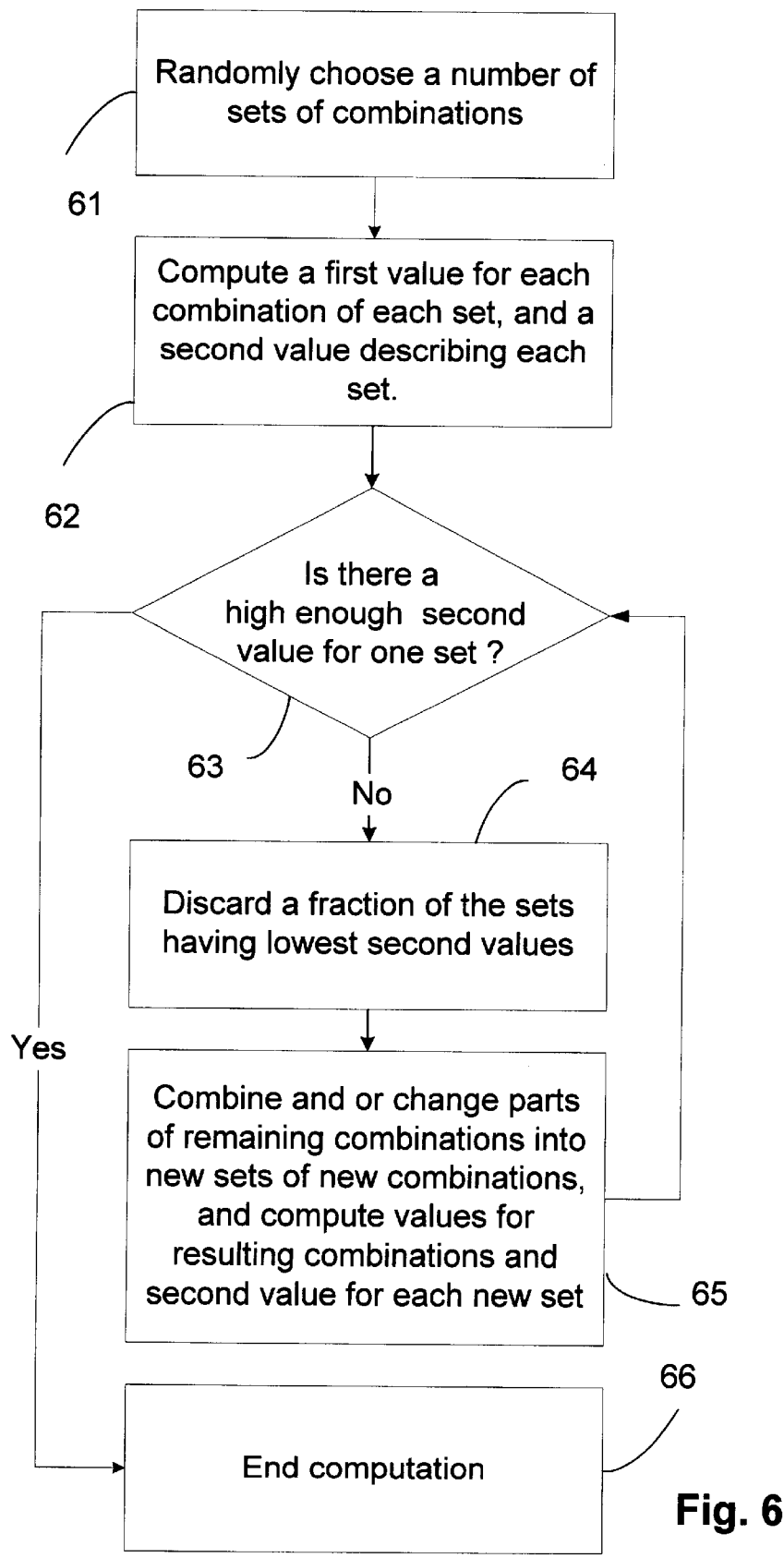
FIG. 6 shows block diagram of an optimization method for the invention.

The preferred embodiment of the invention is to use a genetic algorithm, wherein a number of sets of combinations of the elements and subelements are randomly selected in step 61 of block diagram of FIG. 6, and the values are calculated for each combination of each set.

In the present example of a lens problem having 10 groups of 9 elements and subelements, for example, 20 to 30 different sets of 10 possible combinations of the 9 elements is chosen. Each set is given a second value which should be optimized in the Genetic optimization process. For example the number of combinations in the set which have values exceeding a criterion could be chosen as the second value of a set. Then, some of the sets with the lowest second values are discarded, and parts of the combinations in the remaining sets having higher second values are combined with parts of other combinations to form a new batch of sets. The process is repeated and the number of sets with combinations having acceptable values statistically increases with time.

Obviously, many modifications and variations of the present invention are possible in light of the above teachings. It is therefore to be understood that, within the scope of the appended claims, the invention may be practiced otherwise than as specifically described.

We claim:

1. A method for selecting parts for N similar assemblies, each assembly comprising M parts, comprising:
   a) grouping parts into M groups, each group having a number $n_m \geq N$ of similar parts, wherein M, N and $n_m$ are integers greater than 4, and wherein m is an integer from 1 to M;
   b) recording a number $p_m$ of physical characteristics for each of the $n_m$ parts in each of the M groups;
   c) selecting a first group consisting of one part from each of the M groups of parts; then
   d) computing a value that the first group would have if assembled into an assembly, the value computed using the physical characteristics of each of the M parts selected; and then
   e) repeating steps c) and d) until N groups of parts are selected, each group consisting of one part from each of the M groups of parts, and wherein no part is a member of more than one of the N groups of parts, and wherein the value for each group meets a criterion;
   wherein each $p_m$ is an integer, and wherein each of the N selected groups of M parts, when assembled together into an assembly, cooperate together to perform the same function.

2. The method of claim 1, further comprising
   f) assembling the N groups of parts into N assemblies.

3. The method of claim 2, further comprising:
   g) measuring the value for each of the N assemblies.

4. The method of claim 1, wherein each part is a lens element, and each assembly of M parts forms a lens.

5. The method of claim 4, wherein the value of the lens is a merit function.

6. The method of claim 5, wherein the criterion is that the finished lens would have the required resolution over the field of view and wavelength region.

7. The method of claim 6, further comprising:
   f) assembling the N groups of lens elements into N lenses.

8. The method of claim 6, wherein step e) comprises:
   optimizing the selection of parts until N reaches a preset number.

9. The method of claim 8, wherein the optimization method is an exhaustive computation of all possible combinations of the $n_m \times M$ parts, followed by selection from the group of combinations where the value meets the criterion .

10. The method of claim 8, wherein the optimization method is a random search.

11. The method of claim 8, wherein the optimization method uses a genetic algorithm.

12. The method of claim 1, wherein step e) comprises:
    optimizing the selection of parts until N reaches a preset number.

13. The method of claim 12, wherein the optimization method is an exhaustive search of all possible combinations of the $n_m \times M$ parts.

14. The method of claim 12, wherein the optimization method is a random search.

15. The method of claim 12, wherein the optimization method uses a genetic algorithm.

* * * * *